Aug. 12, 1941.                 W. MENDIUS                    2,252,020
                        DISTILLATION OF HYDROCARBONS
                           Filed May 11, 1938           2 Sheets-Sheet 2
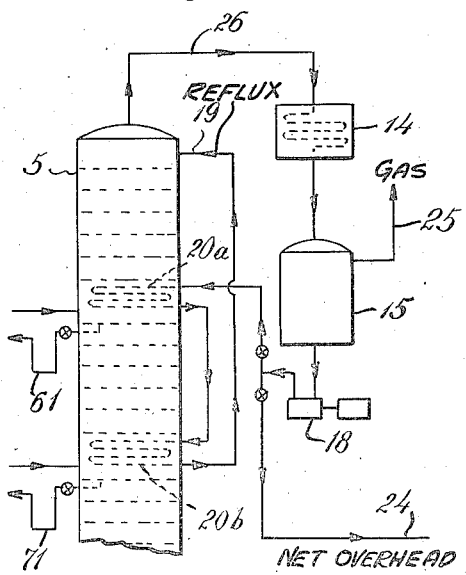
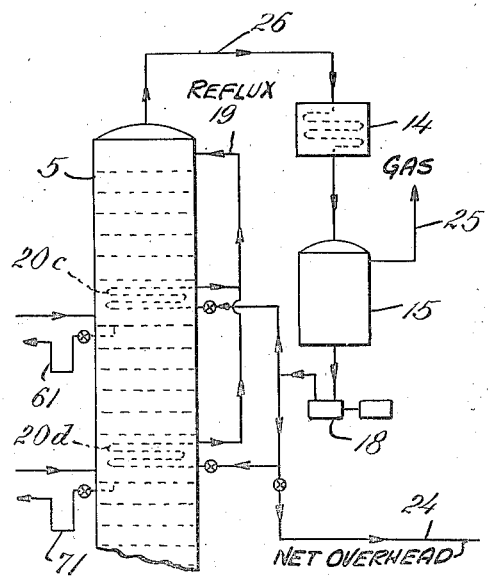
INVENTOR
William Mendius
BY
ATTORNEYS Patented Aug. 12, 1941

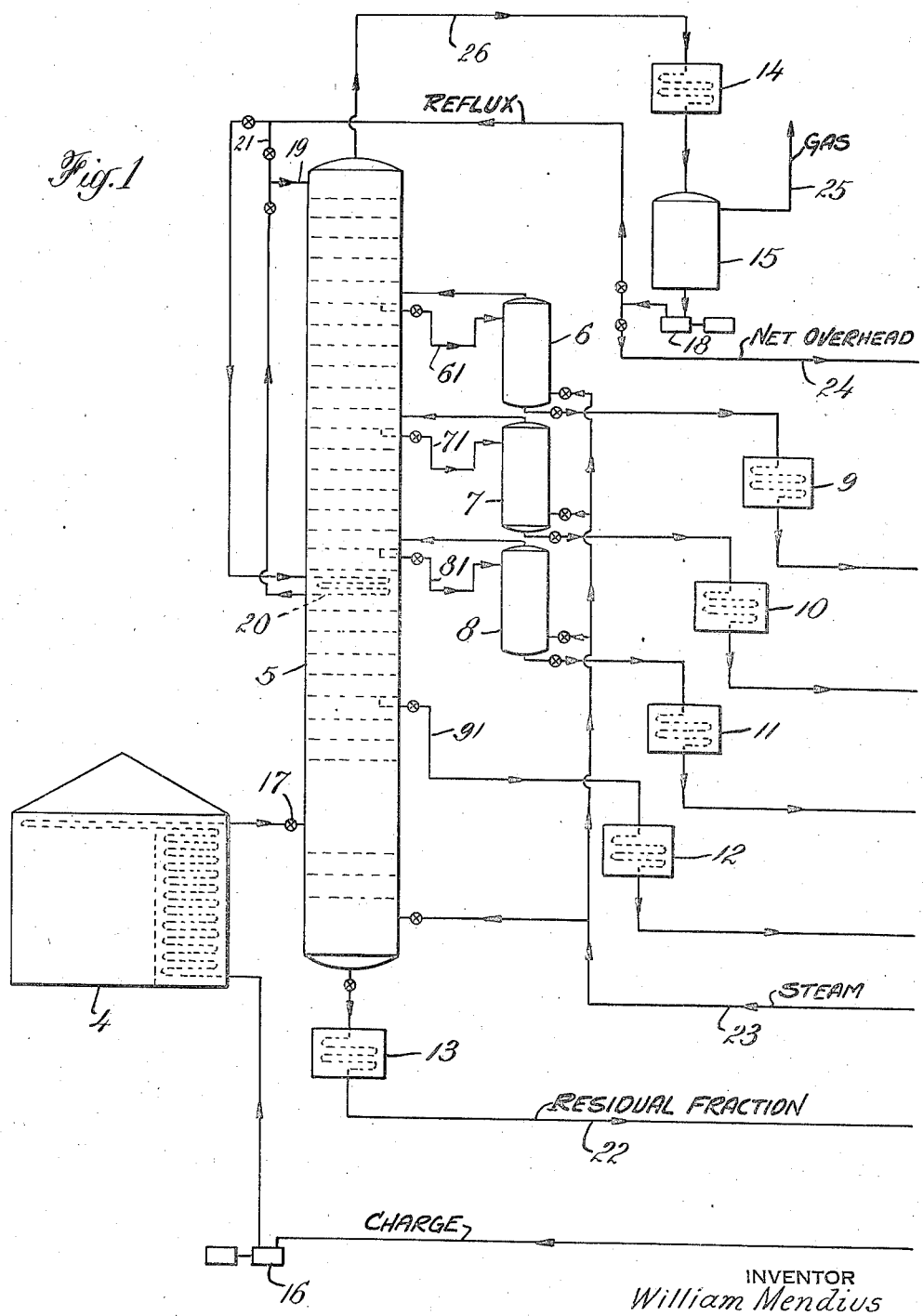

2,252,020

UNITED STATES PATENT OFFICE 2,252,020

DISTILLATION OF HYDROCARBONS

William Mendius, Munster, Ind., assignor to Sinclair Refining Company, New York, N. Y., a corporation of Maine Application May 11, 1938, Serial No. 207,319

5 Claims. (Cl. 196—94)

This invention relates to improvements in the fractionation of petroleum stocks in towers into which a stream of the stock is discharged after being heated to a temperature sufficient to vaporize a substantial part of the stock under the pressure prevailing in the tower.

In such operations, fractionation is effected by countercurrent contact and heat exchange between vapors flowing upwardly through the tower and reflux flowing downwardly through the tower. The reflux must serve two functions; it must be sufficient in quantity to effect the desired fractionation and, in addition, it must be sufficient in quantity to absorb the heat necessary to be absorbed to maintain a balance with respect to the heat content of the stream of stock entering the tower. Since the lower boiling components of the stream of entering stock are, at the temperature at which this stream enters the tower, superheated to a substantial degree, the quantity of reflux diminishes progressively from the point at which the reflux is initially introduced into or produced in the tower to the lower point at which the stream of stock enters the tower. This is the consequence of the fact that the absorption of superheat does not produce corresponding condensation. Such fractionating operations are characterized by this diminishing quantity of reflux whether or not intermediate fractions, sidestreams, are withdrawn from the tower.

As a consequence of this characteristic of the operation, the reflux ratio at higher points in the tower usually exceeds, substantially, that required to effect the desired fractionation of the overhead product and any lower boiling intermediate products. This is particularly true when intermediate fractions are withdrawn from the tower. The result is that, in a normally refluxed tower of uniform diameter, the vapor velocities in the upper part of the tower are substantially higher than are those in the lower part of the tower. Thus, designed against a maximum permissible vapor velocity, a tower of minimum size would have the general configuration of an inverted cone. The diameter of the conventional cylindrical tower being fixed by the maximum vapor velocity, that at the top of the tower, the lower part of such towers is always oversize.

This invention makes it possible materially to reduce the diameter of towers of conventional cylindrical construction, used in such fractionation operations, by proper distribution of appropriate quantities of reflux of appropriate quality through the tower. The invention also has several important advantages with respect to control.

In accordance with this invention, the fractionation tower is refluxed by reintroduction at a point below that at which it is withdrawn of a liquefied fraction withdrawn from the tower, the fraction being cooled after passing the reintroduced fraction in indirect heat exchange with the vapors and liquids flowing through the tower in a region, or in several regions, below the point at which the reintroduced fraction is reintroduced into the tower. If the indirect heat exchange is effected in several regions, the fraction to be reintroduced is with advantage passed first through the region at higher level and then successively through the regions at lower level. If one or more sidestreams are withdrawn from the tower, at least one sidestream is with advantage withdrawn at a point between the point of reintroduction and the region of heat exchange. If two or more sidestreams are withdrawn, one sidestream is with advantage withdrawn at a point between the point of reintroduction and the region of heat exchange and one sidestream is with advantage withdrawn at a point below the region of heat exchange.

The invention will be further described in connection with the accompanying drawings which illustrate, diagrammatically and conventionally, three forms of apparatus appropriate for carrying out the process of the invention. In the accompanying drawings, Fig. 1 represents in elevation a fractionating system, Fig. 2 represents in fragmentary elevation a modified fractionating system, and Fig. 3 represents in fragmentary elevation another modified fractionating system.

In the system illustrated in Fig. 1, 4 is a conventional heater, 5 is a fractionating tower, 6, 7 and 8 are conventional sidestream strippers, 9, 10, 11, 12 and 13 are conventional coolers, 14 is a conventional condenser wherein vapors are condensed by cooling in the conventional manner, and 15 is a conventional receiver. In carrying out the process of the invention in this system, the stock to be fractionated is forced, by means of pump 16, through the heater 4 in which it is heated to a temperature sufficient to vaporize a substantial part of the stock upon introduction into the tower 5 and from the heater is discharged, at this temperature, into the tower 5 through valve 17. Usually a pressure reduction is effected by means of valve 17. Upon introduction into the tower, vaporization and vapor separation take place, the liquid flowing downwardly and the vapors upwardly through the tower. A part of the condensate collected in receiver 15 is reintroduced into the tower 5 by means of pump 18, ultimately through connection 19. This reintroduced fraction refluxes the tower 5. Before reintroduction, however, at least a part of this reintroduced fraction is passed through the heat exchange coil 20 arranged below the connection 19. Part of the reintroduced fraction may be by-passed through valved connection 21. The rate of reintroduction of condensate from receiver 19 is regulated, with respect to the rate and temperature at which the stock from the heater 4 is discharged into the tower 5, to effect the desired fractionation. Sidestreams as desired may be withdrawn through connections 61, 71, 81 and 91. The residual fraction is discharged through connection 22. Steam to strip the residual fraction in the tower and to effect stripping in the strippers 6, 7 and 8 is supplied through connection 23, provided with appropriate valved branch connections. The net overhead product is discharged through connection 24, any gas being discharged through connection 25. The condensate collected in the receiver 15, part of which is reintroduced into the tower 5 as explained, leaves the tower 5 through connection 26 as a vapor mixture and is liquefied in condenser 14.

The operation just described enables the equalization of reflux quantity through the fractionating tower without prejudice either to fractionation efficiency or thermal efficiency. This equalization of reflux quantity through the tower in turn makes possible the use of a simple cylindrical tower of minimum diameter. Important economies are thus to be secured. In the particular system illustrated in Fig. 1, reflux or part of the reflux necessary to effect fractionation in the lower part of the tower 5 is produced by indirect heat exchange in the region of coil 20 making it unnecessary to have any corresponding flow of reflux downwardly through the tower 5 above this region, while the reflux necessary to effect fractionation in the upper part of the tower 5 is supplied by the fraction introduced, preheated by the heat exchange in coil 20, through connection 19. In another aspect, part at least of the superheat of the lower boiling components of the stream of stock entering the tower 5 from the heater 4 is absorbed by the fraction flowing through the coil 20 instead of being absorbed solely by vaporization, after introduction, of an introduced refluxing fraction.

The following example will illustrate an important advantage of the invention, the values in column I being for an operation embodying the invention and those in column II being for an operation corresponding except for the reintroduction of the refluxing fraction without passage through the heat exchanger:

Stream quantities:

| | | |
|---|---|---|
| Crude feed | barrels per hour | 535.7 |
| Gasoline net overhead | do | 121.0 |
| Naphtha side stream | do | 28.8 |
| Kerosene side stream | do | 53.3 |
| Light gas oil side stream | do | 34.5 |
| Heavy gas oil side stream | do | 58.1 |
| Reduced crude bottoms | do | 240.0 |
| Reflux | do | 408.0 |
| Steam in overhead, pounds per hour | | 3570 |

| Conditions | With exchange | Without exchange |
|---|---|---|
| Pressure | Atmospheric | Atmospheric |
| Temperatures, °F.: | | |
|   Gasoline overhead stream | 100 | 100 |
|   Reflux entry | 200 | 100 |
|   Top tower | 250 | 250 |
|   Below position of reflux exchanger | 500 | 500 |
| Vapor velocity and tower diameter: | | |
|   At top (second tray from top)— | | |
|     Vapor quantity, cubic feet per second | 229 | 285 |
|     Allowable linear vapor velocity, feet per second | 2.11 | 2.09 |
|     Required tower diameter, feet | 11.75 | 13.2 |
|   Below position of reflux exchanger— | | |
|     Vapor quantity, cubic feet per second | 191.5 | 191.5 |
|     Allowable linear vapor velocity, feet per second | 1.93 | 1.93 |
|     Required tower diameter, feet | 11.25 | 11.25 |

Without the invention, the required tower diameter at the upper end is 13.2 feet whereas with the invention, the required tower diameter at the upper ends is only 11.75 feet. The required tower diameter below the exchanger is but 11.25 in either case. Incidentally, the stripping steam remaining constant, the decreased quantity of vapors at the top of the tower results in a higher ratio of steam to oil vapors at this point which permits a slightly higher permissible maximum vapor velocity. This permits a minor but further reduction in tower diameter.

The same parts are designated by the same reference characters in Figs. 1, 2 and 3. In the system illustrated in Fig. 2, the reintroduced fraction passes through two heat exchange coils 20a and 20b before reintroduction through connection 19, passing first through coil 20a at the higher level and then through coil 20b at the lower level. In the system illustrated in Fig. 3, the reintroduced fraction is divided into two streams passed in parallel through the heat exchange coils 20c and 20d before reintroduction through connection 19.

With respect to control, the process of the invention has an important advantage in simplicity and another in the elimination of time lag between the act of regulation and establishment of the intended condition. Simple regulation of the rate at which the reintroduced fraction flows through the indirect heat exchange and thence into the tower at a higher point simultaneously effects a corresponding regulation of the refluxing below the heat exchange and of the refluxing below the point of introduction of the fraction. The combined control is effected at a single point of regulation. Elimination of time lag is peculiarly important in the operation of large towers, and particularly of large towers from which a number of sidestreams are withdrawn. With conventional practices, there is usually a considerable time lag between the establishment of correct conditions say at the top of the tower and the establishment of correct conditions at one or more intermediate points from which a sidestream is withdrawn. This invention materially facilitates control of the tower in this respect.

I claim:

1. In the fractionation of petroleum stocks in towers into which a stream of the stock is discharged after being heated to a temperature sufficient to vaporize a substantial part of the stock under the pressure prevailing in the tower, the improvement which comprises refluxing the tower by reintroduction at a point below that at which it is withdrawn of a liquefied fraction withdrawn from the tower, said fraction being cooled, and passing the cool fraction in indirect heat exchange with the vapors and liquids flowing through the tower in a region below the point at which it is reintroduced after it is withdrawn and before it is reintroduced.

2. In the fractionation of petroleum stocks in towers into which a stream of the stock is discharged after being heated to a temperature sufficient to vaporize a substantial part of the stock under the pressure prevailing in the tower from which tower at least one side stream is withdrawn, the improvement which comprises refluxing the tower by reintroduction at a point below that at which it is withdrawn of a liquefied fraction withdrawn from the tower, said fraction being cooled, and passing the cool fraction in indirect heat exchange with the vapors and liquids flowing through the tower in a region below the point at which it is reintroduced after it is withdrawn and before it is reintroduced, and withdrawing a side stream at a point between the point of reintroduction and the region of heat exchange.

3. In the fractionation of petroleum stocks in towers into which a stream of the stock is discharged after being heated to a temperature sufficient to vaporize a substantial part of the stock under the pressure prevailing in the tower from which tower at least two side streams are withdrawn, the improvement which comprises refluxing the tower by reintroduction at a point below that at which it is withdrawn of a liquefied fraction withdrawn from the tower, said fraction being cooled, and passing the cool fraction in indirect heat exchange with the vapors and liquids flowing through the tower in a region below the point at which it is reintroduced after it is withdrawn and before it is reintroduced, withdrawing a side stream at a point between the point of reintroduction and the region of heat exchange, and withdrawing another side stream at a point below the region of heat exchange.

4. In the fractionation of petroleum stocks in towers into which a stream of the stock is discharged after being heated to a temperature sufficient to vaporize a substantial part of the stock under the pressure prevailing in the tower, the improvement which comprises refluxing the tower by reintroduction at a point below that at which it is withdrawn of a liquefied fraction withdrawn from the tower, said fraction being cooled, and passing the cool fraction in indirect heat exchange with the vapors and liquids flowing through the tower in a plurality of regions below the point at which it is reintroduced after it is withdrawn and before it is reintroduced.

5. In the fractionation of petroleum stocks in towers into which a stream of the stock is discharged after being heated to a temperature sufficient to vaporize a substantial part of the stock under the pressure prevailing in the tower, the improvement which comprises refluxing the tower by reintroduction at a point below that at which it is withdrawn of a liquefied fraction withdrawn from the tower, said fraction being cooled and passing the cool fraction in indirect heat exchange with the vapors and liquids flowing through the tower in a plurality of regions first at a higher level and successively at a lower level below the point at which it is reintroduced after it is withdrawn and before it is reintroduced.

WILLIAM MENDIUS.